Jan. 27, 1970     LE ROY D. GORE ET AL     3,491,915
SINGLE MOTOR DRIVE FOR STACKED COMPARTMENT
CONVEYOR OF VENDING MACHINES Filed March 27, 1968                           6 Sheets-Sheet 1

INVENTORS.
LeRoy D. Gore
Kermit W. Dyer

BY Schmidt, Johnson, Hovey,
Williams & Bradley
ATTORNEYS.

INVENTORS.
LeRoy D. Gore
Kermit W. Dyer

BY Schmidt, Johnson, Hovey,
Williams & Bradley.
ATTORNEYS.

United States Patent Office 3,491,915
Patented Jan. 27, 1970

3,491,915
SINGLE MOTOR DRIVE FOR STACKED COMPARTMENT CONVEYOR OF VENDING MACHINES
LeRoy D. Gore, Independence, Mo., and Kermit W. Dyer, Overland Park, Kans., assignors to The Vendo Company, Kansas City, Mo., a corporation of Missouri
Filed Mar. 27, 1968, Ser. No. 716,403
Int. Cl. G07f 11/46
U.S. Cl. 221—76                           25 Claims

ABSTRACT OF THE DISCLOSURE

A selective product dispensing machine having a product access station and a series of product dispensing conveyor units each having a pair of separate upright stacks of compartments. Releasable latches support the lowermost compartment and all of those thereabove in one stack of each conveyor unit. A drive assembly common to all of the conveyor units is operable to control and effect incremental movement of a selected conveyor unit only to successively shift the compartments thereof into registration with the product access station. Each compartment has side rollers thereon and the drive assembly employs slotted cam transfer wheels which during rotation thereof first receive and support a released compartment as the rollers rest on the respective cam wheels, then transfer the compartment underneath the associated stack as the rollers ride in the slots in respective cam wheels, and finally lift the transferred compartment and all of those thereabove as the rollers of the compartment move back onto the peripheral cam surfaces of the cam wheels. Pusher structure at the top of the conveyor unit is operable to shift the uppermost compartment of the last raised stack to the upper end of the associated stack which has been lowered by release of one of the compartments therefrom.

---

This invention relates to a selective, multiple conveyor product dispensing machine of the first-in first-out type having a single motor drive for all of the product conveyors. Each of the product dispensing conveyor units has a pair of separate upright stacks of compartments and the common drive assembly is operable to control and effect incremental movement of a selected conveyor unit only to successively shift the compartments thereof into registration with the product access station of the machine.

Stacked compartment product dispensing machines have been suggested in the prior art but have not been commercially advantageous heretofore because of their relatively high costs of production and the maintenance difficulties encountered because of the complex nature of the operating mechanisms. A demand exists for commercial successful machines in this category though because they have the advantage of affording a low profile since dispensing can be effected from essentially the top of the machine cabinet while at the same time providing product selectivity across the front of the unit.

In past assemblies, products have been made available for dispensing or accessible to the customer by controlled shifting of a series of product compartments to successively bring the same into alignment with a product station. In order to provide successive shifting of the compartments to the product access or delivery station, structure has been provided to raise the compartments of one stack of each conveyor unit, lower the compartments of the other stack associated therewith, while effecting shifting of the lowermost compartment of the lowered stack into underlying relationship to the other stack and raising of such stack so that the uppermost compartment of the latter may be transferred onto the lowered stack. One machine of this general type which at the same time provides a series of conveyor units for dispensing of different types of products, is shown in U.S. Patent No. 2,468,819.

Although stacked compartment product dispensing machines have many advantages from a space conservation viewpoint and provide flexibility for use of the machine with a variety of different articles including fresh or deformable packages and products of various sizes, no really successful solution has heretofore been found to the problems of high initial cost and persistent difficulties encountered in maintaining the machines in operation for the periods of time competitively demanded in the coin operated vending machine field. One especially critical problem has been the one of providing a common drive assembly of practical size and cost for shifting the compartments of the respective conveyor units on a selective basis while at the same time capable of handling not only the weight of the articles in corresponding stacks of each conveyor unit, particularly when all of the compartments are full, but also the mass of the compartments themselves. In order to compete with presently available equipment of different construction and operation, the machines should be capable of handling a large variety of hot and cold products such as candy, pastry, chips, milk, ice cream, cold food, hot food, fruit and canned goods without significant alteration of the dispensing mechanism.

The practical difficulties encountered in producing a commercially acceptable machine have been further compounded by the desirability of providing a machine which is adapted for handling compartments of different sizes or different sized products without basic modification of the machine and still use the same drive unit, while at the same time capable of handling products of different relative weights and package configurations. In addition, the mechanism should be capable of operating under different ambient conditions so that hot foods as well as cold and frozen food products may be dispensed from the unit without alteration of the operating structure. Because of the provision of a compartment for each product representing the total capacity of the machine, it is also necessary that the compartments be constructed in a sufficiently economical manner to justify the provision of one compartment for each article to be dispensed or vended.

It is therefore the primary object of the present invention to provide a first-in first-out stacked compartment dispensing machine having a series of conveyor units made up of two stacks of product compartments successively movable into registration with a product access station, wherein a single drive motor may be used to incrementally move the compartments of a selected conveyor and wherein only the compartments of the conveyor from which a product is to be or has just been dispensed are moved through a compartment shifting cycle during each operation of the machine to minimize the size of the power train required to effect shifting of the compartments.

It is a further important object of the invention to provide a stacked compartment dispensing machine as described having novel compartment transfer structure rotatable by the single drive motor which retains control over the compartments during transfer thereof to preclude damage to the products or jamming of the compartments during shifting thereof and as a result materially increasing the reliability of the mechanism which is a requirement for vending machines which must necessarily operate for long periods without failure under varying demands and conditions.

A further important object of the invention is to provide a stacked compartment dispensing maching of the characteristics described which employs novel compartment cam transfer wheel structure at the lower ends of the conveyor stacks that is capable of shifting compartments of various heights and widths without alteration in the construction or operation of the cam transfer wheels or fabrication of different basic components for machines having different sized compartments.

Another important object in this respect is the provision of a dispensing machine having a series of product-dispensing conveyor units each provided with a pair of separate upright stacks of campartments wherein compartments of different heights and widths may be positioned side by side in a single machine and in any relative positions desired without affecting the configuration and operation of the cam transfer wheels rotated by the single drive motor of the machine, thus minimizing the cost of the unit and at the same time simplifying its construction and operation.

It is an object of the invention to provide a stacked compartment, multiple conveyor dispensing machine wherein separate, operationally interrelated, highly dependable latch and cam transfer wheel structures are provided for releasing the lowermost compartment of one stack to permit lowering of such stack, thereafter transfer the released compartment to the bottom of the associated stack, then raise the transferred compartment as well as all of the compartments thereabove in the other stack, and finally shifting the uppermost compartment of the raised stack to the top of the stack which has just been lowered.

Support members are provided, in association with the stacks of compartments which are raised, for supporting all of the compartments of such stacks and are operable to pass a new lowermost compartment and then to move back into supporting relation therebeneath. Since the common drive assembly inherently has no means to separately distinguish and apply lift only to the stack containing a newly transferred compartment to clear the respective support member, all of such stacks must be lifted sufficiently during each cycle of machine operation in order to provide the necessary clearance of support members. The cam wheels have raised lobes thereon for shifting the lowermost compartment of such other stacks and all of the compartments thereabove upwardly through a displacement effective to move the lowermost compartment of the stacks onto the supports therefor and wherein the raised lobes on the cam wheels are staggered across the width of the machine so that only a fractional portion of the total of such other stacks is being lifted at a time to thus minimize the size of the drive motor required to rotate the compartment transferring cam wheel structure.

A further important object of the invention is to provide a stacked compartment dispensing machine wherein is provided improved latch means as described in association with the lowermost compartment of each stack of compartments which are adapted to be lowered as the lowermost compartment is released by the respective latch mechanism, with the latch mechanism including a swingable member associated with each series of compartments provided with a lip thereon adapted to underlie the lowermost compartment of the corresponding stack and mounted for pivoting movement about an axis positioned above the compartment supporting lip so that the weight of the compartments on the latch member tend to swing the latter into a compartment releasing position upon release of a respective member and thus provide more positive release of the compartment from the selected stack thereof. A further object in this respect is to provide latch mechanism as characterized above wherein each of the latch members is controlled by a solenoid for selective release of a compartment from one of a series of stacks thereof, and wherein the armature of the solenoid acts as a latching device for holding the compartment supporting member in the normal latched position thereof so that upon actuation of one of the solenoids, positive release of the lowermost compartment of the stack controlled thereby is assured by virtue of the elimination of all intermediate linkage between the release solenoid and the compartment supporting member.

An important object of the invention is to provide a stacked compartment dispensing machine particularly adapted for vending articles of various types by virtue of the fact that the product next to be vended may be displayed in an area unaccessible to the customer but which is then moved to a station where the product may be grasped and removed by the customer, thus negating the necessity of providing a complicated door or gate lock system normally found necessary in vending machines. A corollary object is to provide a machine wherein successive movement of the product compartments into a product access station is effected with each of the products next to be vended being disposed in a location permitting viewing thereof so that a common vending station for all of the conveyor units for the machine may be used and normally closed by a single door. This also contributes to the elimination of complicated and expensive door interlock structure conventionally employed in multiple-product vending units.

A still further important object of the invention is to provide a stacked compartment dispensing machine wherein upon release of the lowermost compartment from one stack of a conveyor unit of the machine, the stack is thus lowered and the released compartment transferred to the associated stack and such stack raised as a consequence thereof, and wherein is provided improved structure adjacent to the upper ends of the stacks fror shifting the top compartment of the last raised stack onto the upper extremity of the stack of compartments which has just been lowered, utilizing shifting mechanism cam operated directly from the compartment transfer structure so that correct timing is always maintained between the moving components and obviating jamming of the machine because of nonsynchronized shifting of the respective compartments.

Another important object of the invention is to provide a stacked compartment despensing machine employing improved guide structures for the compartments during shifting and transfer thereof to improve the reliability of the unit and minimize the tendency of the compartments to jam during vertical shifting as well as horizontal transfer thereof.

An object of the invention is to provide a stacked compartment dispensng machine wherein compartments of different heights and widths may be provided in a single machine notwithstanding the provision of a common product viewpoint across the width of the machine to permit a uniform cabinet design for all machines regardless of the nature of the products to be dispensed therefrom.

Another object of the invention is to provide a machine of the described advantages which may be used for dispensing without money deposit in cafeteria operattions or the like by virtue of the fact that the height of product access permits installation of a tray rail on the front of the machine if desired without in any way affecting the basic operational function of the machine. In this respect, another important object is to provide a machine which may be operated with or without coin deposit as selected by the proporietor. As a consequence, the equipment may be used on a deposit basis during off-peak periods when the number of operating personnel for the machines is maintained at a minimum, but allowing nondeposit dispensing in peak periods when it is desirable to permit as many people as possible to move through the line in a minimum of time and without the necessity of inserting money deposits for each item selected.

A subsidiary object of the present invention is to provide a jam-free stacked compartment dispensing machine wherein the single motor compartment transfer cam structure employs a series of rotatable slotted wheels having peripheral surfaces disposed to engage rollers projecting from the sidewalls of each of the compartments so that upon release of the lowermost compartment of one stack, the compartment is immediately supported by the cam and is then transferred from beneath the first stack to a position underlying the associated other stack while being held my the cam wheel structure within the slots therein, so that the compartments are never dropped during transfer which would be detrimental to the products contained thereon as well as make it difficult to provide a selectively operable machine wherein only the compartments of a conveyor unit selected by the customer are caused to go through a complete displacement cycle.

Other important objects, features and advantages of the present invention will be described or become apparent in the detailed description of the invention hereunder.

Figure 1:
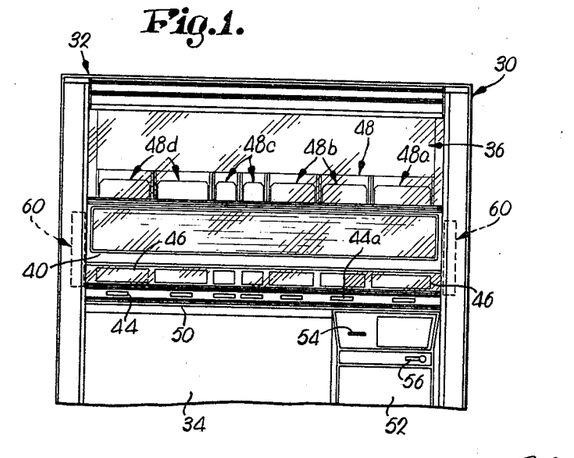
FIGURE 1 is a fragmentary front elevational view of a stacked compartment dispensing machine of the deposit actuated type and illustrating the product display area of the cabinet, the product access door, selection buttons and appropriate product identification windows for the buttons, and the money deposit section of the cabinet.
Figure 2:
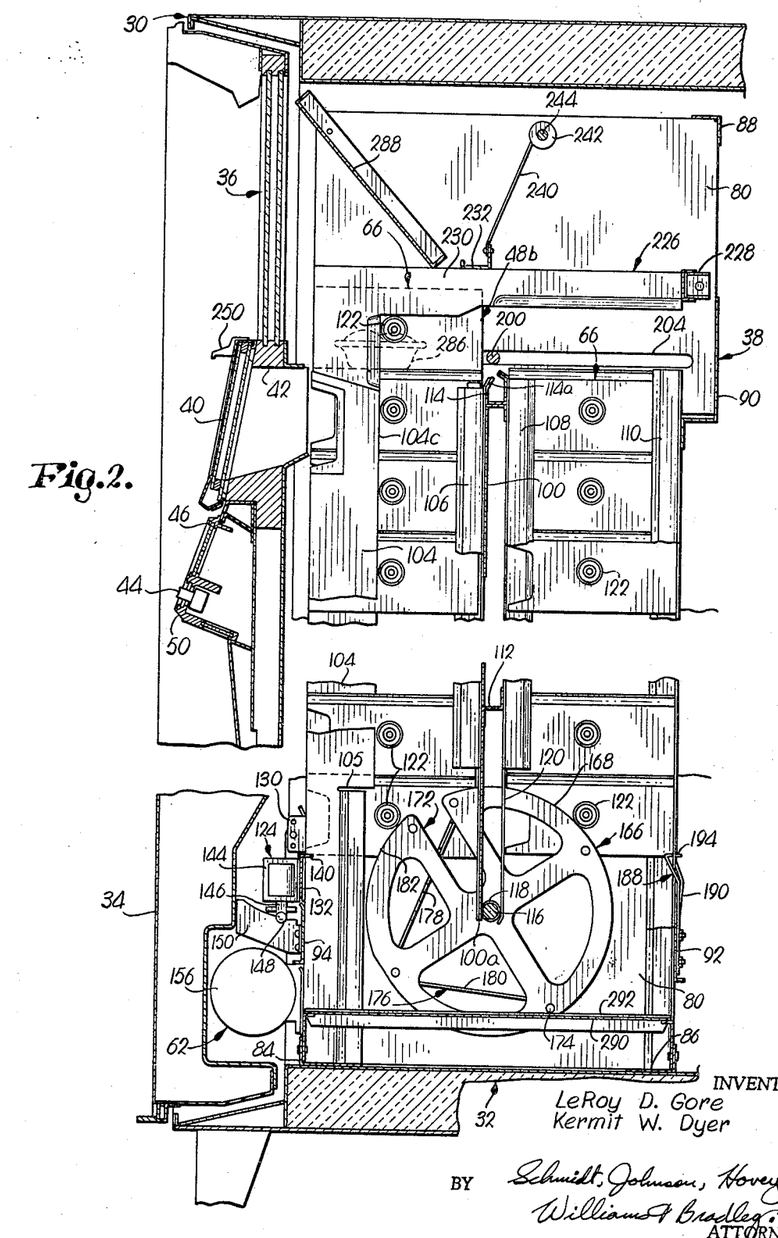
FIGURE 2 is an enlarged, vertical cross-sectional view through the cabinet and conveyor units installed in the cabinet of FIG. 1, with the sectional view being taken on a vertical plane through an end conveyor unit, looking toward the adjacent unit, but with the compartments removed from the column through which the section is taken for clarity, with certain parts of the structure being broken away and in section.

The dispensing machine broadly designated 30 in FIG. 1 has a cabinet 32 preferably provided with insulated top, back, side and bottom walls along with an outwardly swingable insulated front door 34. A double glass and thereby insulated pane assembly 36 across the top of the door 34 permits viewing of products therethrough carried by the dipensing mechanism 38 within cabinet 32. Dispensing mechanism 38 is preferably fabricated as a separate assembly which may be inserted onto the interior of the cabinet and secured to the latter. A double glass panel or dispensing door 40 pivotally mounted on door 34 immediately below assembly 36 and swingable about a generally horizontal axis at the bottom of the panel, is located in normal closing relationship to a horizontal product access opening 42 extending across the width of door 34. Opening 42 is aligned with the upper portion of mechanism 38 as is best shown in FIG. 2.

Product selection push buttons 44 mounted under panel 40 are aligned with respective recesses 46 which are adapted to receive product identification stickers corresponding to the products contained in the respective conveyor units 48 of mechanism 38. The section 50 of door 34 receiving push buttons 44 and defining recesses 46 is preferably of configuration as shown in FIG. 2, permitting mounting of suitable illumination means therein such as fluorescent tubes or the like to light up the product strips as well as the push buttons 44.

Although not detailed in the drawings, it is preferred that the coin control unit of the machine be mounted in the housing 52 forming a part of door 34 to permit ready access to the coin control structure and at the same time preclude such mechanism from interfering with the capacity of cabinet 32. The coin slot 54 leads to the coin accept and reject assembly which is preferably a part of a coin changer which will totalize the value of money deposited in the machine and then return change if an excess deposit is made, or the customer selects a lower priced product than that originally chosen if the first selected product is sold out. Thus it can be appreciated that the coin control mechanism is preferably of the escrow type which permits establishment of credit in the machine and which is retained until the customer makes a product choice. The coin return lever 56 on housing 52 permits the customer to obtain return of his money after deposit thereof, if he elects not to purchase an article or the one which he initially selects is sold out.

Although not specifically illustrated in the drawings, it is to be understood that the door 34 is normally locked and the only access available to mechanism 38 is through opening 42 covered by swingable panel 40. However, as will be explained, the door or panel 40 is normally not locked but the customer cannot obtain a product from the mechanism 38 therebehind until after appropriate deposit has been made in the machine. A pair of lock structures 60 are provided for securing panel 40 during cycling of the conveyor unit 48. One of the lock structures is illustrated in detail in FIGS. 13, 14 and 15. These lock structures 60 are designed to prevent opening of panel 40 during the time one of the conveyor units 48 is being operated to bring a product from the viewing location thereof shown in FIG. 2 to the product dispensing station aligned with opening 42. Lock structures 60 are preferably located at both ends of the panel 40 as indicated by the dotted lines in FIG. 1, to prevent application of a twisting force to the door when it is locked.

In order to illustrate the versatility of the drive assembly 62 forming a part of mechanism 38, four different types of conveyor units 48 are illustrated in the drawings employing compartments which vary in width and height although the front to rear dimension of all compartments is necessarily maintained the same. Thus, referring to FIG. 3, the right-hand conveyor unit 48a has a series of compartments 64 of one width while the compartments 66 of the adjacent conveyor units 48b are of the same height as compartments 64 but are narrower in width. 66 but of a width intermediate that of compartments 64 The compartments 68 of the conveyor units 48c are narrower and of less height than both of the compartments 64 and 66, while the compartments 70 of conveyor units 48d are of the same height as compartments 64 and 66 but a width intermediate that of compartments 64 and 66.

Each of the compartments 64, 66, 68 and 70, although having side walls of varying heights and of different widths, is made up of essentially the same elements including a bottom wall 72 and a pair of opposed upright side walls 74 and 76, the uppermost ends of which are joined by a cross piece 78 adjacent the rear upright edges of side walls 74 and 76. Thus, each of the compartments is generally of box shaped configuration and the walls thereof may be transversely bent to provide rib sections or the like as desired to increase the rigidity of the wall structure.

The framework of mechanism 38 for supporting compartments 64, 66, 68 and 70 additionally serves as guides therefor and includes a pair of end walls 80 and 82 which are interconnected in part by angles 84 and 86 at the lower ends thereof and by a top rear angle 88. A series of horizontal cross pieces 90 and 92 below angle 88 at the back of mechanism 38 join end walls 80 and 82 while a horizontal crosspiece 94 extends between the front edges of end walls 80 and 82. It can be appreciated that any number of horizontal reinforcing members may be provided to rigidify the frame assembly and especially the conveyor guides thereof.

Figure 9:
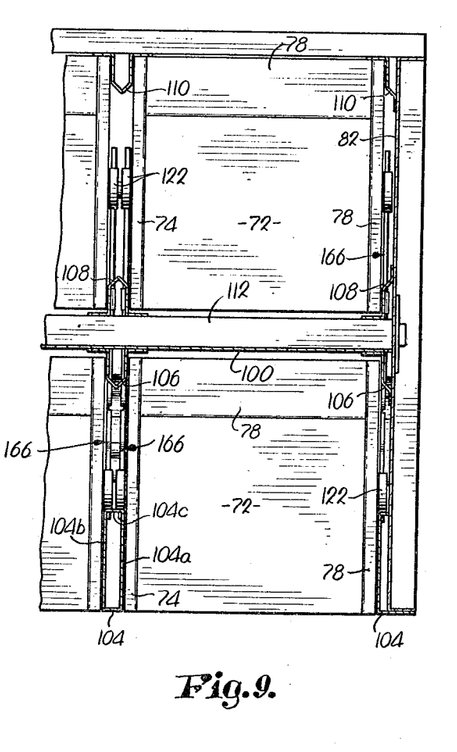
FIG. 9 is a fragmentary, horizontal cross-sectional view taken substantially on the line 9—9 of FIG. 3 and looking downwardly in the direction of the arrows.

Referring to FIG. 2, it is to be noted that an upright divider wall 100 spans the distance between end walls 80 and 82 generally midway between the front and back of mechanism 38. The wall 100 is in perpendicular relationship to conveyor dividing walls each made up of a front strip 104, a forwardly extending strip 106 projecting from the front face of wall 100, a rearwardly facing strip 108 on the opposite face of the wall 100, and a rear strip 110. In addition, the inner faces of the end walls 80 and 82 are also provided with partial strips 104, 106, 108 and 110 to serve as end guides for compartments 64 and and 70 respectively. Referring to the cross-sectional view in FIG. 9, it can be seen that horizantal, vertical spaced, parallel channels 112 between the end walls 80 and 82 serve as supports for divider wall 100 and that the inner strips 106, 108 and 110 between walls 80 and 82 are of generally U-shaped configuration transversely thereof and in conjunction with strips 104 serve as guides for the compartments of respective stacks. Similarly, the front, transversely rectangular strips 104 are of the same transverse width as strips 106, 108 and 110 and have guide faces 104a and 104b which are parallel with the opposed guide surfaces of strips 106, 108 and 110. The end strips 104, 106, 108 and 110 are approximately one-half the dimensions transversely thereof as the inside strips as is also apparent from FIG. 9. The lower extremities of guide strips 104 present notches 105 for clearing opposed guide rollers on the compartments as well as the cam transfer wheels of drive assembly 62.

The top of wall 100 terminates in a horizontal margin aligned with a horizontally extending cross member 114 having an inclined upper leg 114a positioned a substantial distance below the upper margins of end walls 80 and 82 as best shown in FIG. 2 while the lower margin 100a is spaced above the bottom edges of end walls 80 and 82.

The drive assembly 62 includes a horizontal shaft 116 which caried by a series of bearings 118 mounted between divider wall 100 and extensions 120 secured to the lower ends of strips 108.

Figure 10:
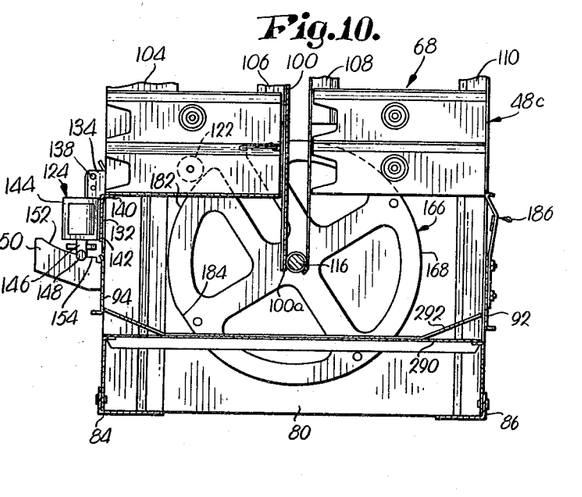
FIG. 10 is a fragmentary, vertical cross-sectional view taken substantially on the irregular line 10—10 of FIG. 3 and showing different sized compartments than those illustrated in FIG. 2.

As is evident from FIGS. 2 and 10, for example, the compartments 64, 66, 68 and 70 are each provided with a roller 122 on opposed upright side walls 74 and 76 thereof projecting outwardly from the outer faces thereof, and located for rotation about aligned axes. For reasons to be explained in greated detail hereinafter, the rollers 122 are each located about ⅛ inch forwardly of upright center lines through side walls 74 and 76 intermediate the upright end margins thereof, although the rollers are equidistantly spaced from the upper and lower horizontal margins of each of the respective side walls 74 and 76.

Thus, referring to FIG. 2 showing the compartments 66 of the conveyor unit 48b adacent to conveyor unit 48a, it can be seen that the rollers 122 of compartments 66 of the front stack thereof rest against the inner margin 104c of the corresponding strip 104 whereby the compartments are trapped between strips 104 and the divider wall 100 until the rollers 122 on the lowermost compartment of a corresponding front stack come into alignment with notches 105 in the guides 104. By virtue of the spacing between strips 108 and 110, the compartments 66 making up the rear stack of conveyor unit 48b are restrained against significant horizontal movement notwithstanding the fact that the rollers 122 thereof do not engage any of the guides as such for the compartments.

The front stack of compartments of each conveyor unit 48 is supported by a respective latch mechanism 124. As is evident from FIGS. 2, 3 and 10, the upright angles 126 and 128 on the front margins of end walls 80 and 82 respectively immediately above crosspiece 94, cooperate with the channels 130 mounted on the front edge of each of the strips 104 in horizontal alignment with angles 126 and 128, to support the latch members 132 for each conveyor unit 48 respectively. Channels 130 serve the additional function of defining a guide surface for the released compartment of each conveyor unit 48 since the lowermost compartment of each front stack loses restraint by strips 104 as soon as the wheels 112 thereof move into alignment with notches 105. Each of the latch members 132 is of U-shaped configuration and has opposed upright, outwardly extending legs 134 and 136 pivtally mounted for rotation on aligned pivot pins 138 carried by adjacent channels 130; or angles 126 and 128 in the case of the end latch members. A horizontal, inwardly bent leg 140 projects from the upright rectangular main body portion 142 of member 132. Thus, as illustrated in FIGS. 2 and 10, the latch members 132 normally support the front stacks of compartments of respective conveyor units 48 with each leg 140 normally underlying the lowermost compartment aligned therewith to support the latter as well as all of the compartments thereabove.

Solenoids 144 mounted on the forward face of each body portion 142 of latch members 132 are located with their armatures 146 movable downwardly and a latching element 148 is secured to and moves with each of the armatures 146 for engagement with arcuate plates 150 connected to and projecting outwardly from the crosspiece 94 immediately below corresponding solenoids 144. The upper arcuate edge 152 of each of the plates 150 has a cutout section 154 at the inner extremity thereof defining a stop shoulder 151 (FIG. 17) for a corresponding latching element 148. It is to be noted in FIG. 3 that the latch mechanisms 124 associated with conveyor units 48c are mounted on crosspiece 94 at a somewhat higher elevation than the remaining latch mechanisms because of the narrower height of compartments 68 as compared with the other compartments.

Figure 3:
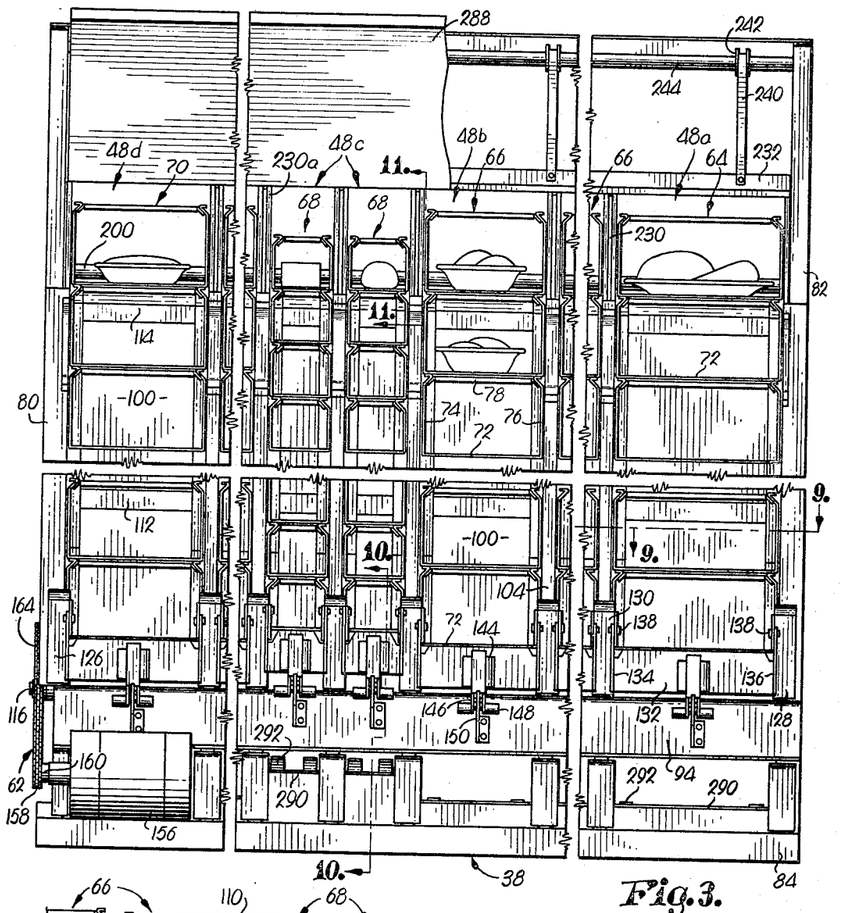
FIG. 3 is a fragmentary, front elevational view on essentially the same scale as FIG. 2 but with the cabinet of the machine removed and parts being broken away and in section for clarity of the view.
Figures 5, 7, 8:
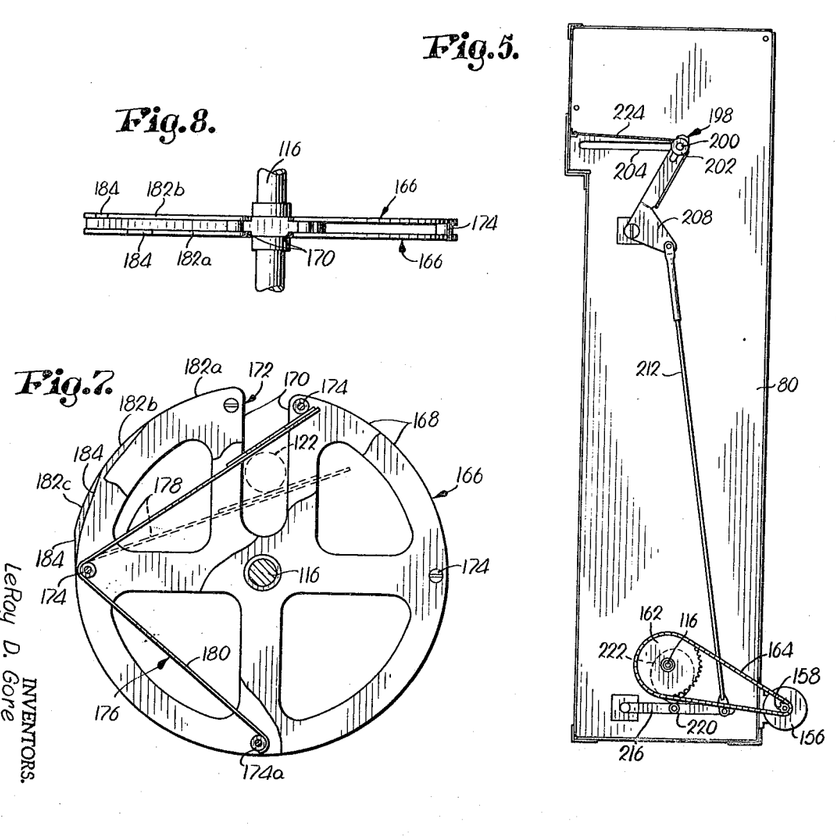
FIG. 5 is a side elevational view of the structure shown in FIG. 3.
FIG. 7 is an enlarged, fragmentary, side elevational view of one of the cam transfer wheel assemblies forming a part of the drive of the machine, with parts thereof being broken away to better illustrate the configuration of the cam members.
FIG. 8 is a top plan view of the structure shown in FIG. 7.
Figure 6:
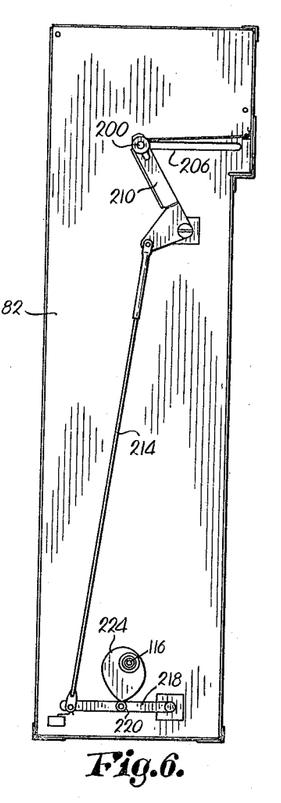
FIG. 6 is a side elevational view of the same mechanism as illustrated in FIG. 5 but showing the opposite end of the dispensing mechanism.

The drive assembly 62 includes a combination electric motor and gear reduction unit 156 having a sprocket 158 on the output shaft 160 thereof which is operably coupled to a sprocket 162 on shaft 116 by link chain 164 (see FIGS. 3 and 5). A pair of cam transfer wheels 166 are provided on shaft 116 for each of the conveyor units 48 on opposite sides of the compartments thereof. As is evident from FIGS. 2, 7 and 10, each transfer wheel has a generally circular peripheral cam surfaces 168 substantially concentric with the axis of shaft 116, along with radially extending spaced edges 170 which define a radial slot 172 of a width only slightly greater than the diameter of rollers 122 on the product compartments. The slot 172 terminates short of the shaft 116, and the cam transfer wheels 166 which are aligned with strips 104 are joined by a series of connectors 174 spaced around the peripheral margin of corresponding wheels. A generally V-shaped spring 176 between the transfer wheels 166 joined by connectors 174 has a leg 178 extending across the aligned slots 172 as best shown in FIG. 7. The leg 178 of each spring 176 is free to flex in a respective slot 172 while the other leg 180 of each spring extends around and is joined to the connector 174a directly opposed to respective slots 172.

Figure 16:
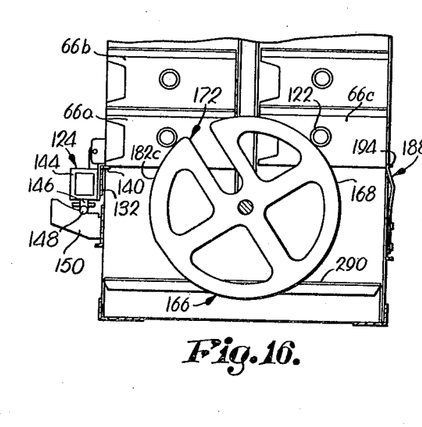
FIG. 16 is an essentially schematic representation of the lower part of one conveyor unit of the machine and illustrating one of the compartment transfer cam structures of the drive assembly as well as the release mechanism for the column with all of the components being shown in their normal standby positions.

The normal standby disposition of transfer wheels 166 is shown in FIGS. 2 and 10 and represented schematically in FIG. 16. Thus, the roller 122 of the lowermost product compartment of the front stack thereof is proximal to a corresponding set of slots 172 but is positioned to initially be supported by the transfer wheels 166 on opposite sides thereof, upon actuation of the corresponding latch mechanism 124 as rollers 122 rest on the peripheral cam surface 168 of cam transfer wheels 166.

Each of the cam transfer wheels 166 has a raised cam lobe section 182 thereon extending from slot 172 around the periphery of the wheel in a counterclockwise direction viewing FIG. 7 with the effective length of each of the lobes 182 varying depending upon the particular conveyor unit 48 with which the respective cam transfer wheels are associated. For example, as indicated in FIG. 7, at least a pair of the wheels 166 have raised cam lobes 182a thereon extending circumferentially of the wheels from slot 172 through an arc of about 40° while the cam lobes 182b on another pair of operably related cam wheels 166 extend through an arc of about 60°. A third set of cam transfer wheels 166 have cam lobes 182c thereon which extend through an arc of about 80°.

In a two-column machine, it is obvious that only two sets of cam transfer wheels 166 would be provided having cam lobes 182a and 182b thereon, whereas a three column machine would have cam transfer wheels with lobes 182, 182b and 182c respectively on the peripheral margins thereof. However, since selective dispensing machines used for commercial purposes will have from six to ten selections in most instances, it can be appreciated that more than one set of cam transfer wheels 166 with lobes 182a, 182b and 182c will be provided and which preferably should be staggered across the width of the cabinet 32 to equalize the load on drive assembly 62 during rotation of cam wheels 166. The ramps 184 leading from cam surfaces 168 up to each of the lobes 182a, 182b and 182c are of gradual slope approaching a tangent to the arcuate lobes so as to provide a smooth transition between the raised area of the respective cam transfer wheels and the circular surfaces 168.

Figure 4:
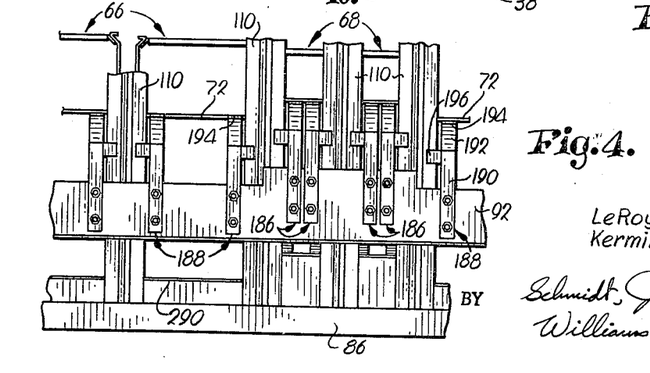
FIG. 4 is a fragmentary, rear elevational view of a part of the structure shown in FIG. 3.

Spring support members are provided on the crosspiece 92 for the rear upright stack of compartments of each conveyor unit 48, and as illustrated in FIG. 4, two substantially J-shaped springs 186 are provided for supporting the rear stacks of each of the conveyor units 48c while a pair of J-shaped supporting members 188 are provided to support the rear compartment stacks of conveyors 48a, b and d. Thus, each of the members 186 and 188 has an elongated major body section 190 mounting an inwardly directed upper segment 192 which, in turn, supports an integral outturned, generally horizontal lip 194 that is adapted to directly underlie the lowermost compartment of a respective rear stack thereof. Tabs 196 joined to each of the body sections 190 project transversely therefrom and are disposed to engage upright strips 110 at the rear of dispensing mechanism 38 to limit the inward swinging movement of segments 192 or respective members 186 and 188 having lips 194 thereon. As shown in FIG. 2, the lips 194 of support members 188 are located in a horizontal plane only slightly above the level of legs 140 of latch members 132 horizontally aligned therewith. In this figure, the front support member 186 shown is aligned with a conveyor unit this side of the one illustrated and is thus in the normal position thereof for supporting the rear stack of compartments for the respective conveyor unit. However, the support members 186 corresponding to the conveyor unit 48b shown is illustrated as being held out of supporting disposition because of engagement of the lip 194 thereof with the lowermost rear stack compartment 60. In this case, the lowermost compartment of the rear stack and all of those above are supported by respective cam transfer wheels 166 since the conveyor unit 48b is shown as being the one operated on the preceding cycle of operation of the machine.

It is to be noted however, that the lips 194 of support members 186 associated with conveyor units 48c are positioned somewhat above the level support members 188 as indicated in FIG. 4. Similarly, the latch members 132 and corresponding solenoids 144 along with plates 150 mounted in front of conveyor units 48c are located at a somewhat higher elevation than the other latch mechanisms 124 as shown in FIG. 3.

All of the compartments of the rear stacks thereof are carried by support members 186 and 188, except for the rear stack corresponding to the compartment transferred during the preceding cycle which is supported by the cam transfer wheels 166 that have moved such compartment.

The pusher structure broadly designated 198 in FIG. 5 for shifting uppermost compartment of the rear stack of each conveyor unit 48 onto the associated front stack during each cycle of operation of the drive assembly 62, includes an elongated horizontal bar 200 pivotally carried in bearing sleeves 202 reciprocable in horizontal aligned slots 204 and 206 at the upper ends of end walls 80 and 82 respectively. Bell cranks 208 and 210 pivotally mounted on walls 80 and 82 below respective ends of bar 200 and pivotally joined to the latter, are rocked by connecting rods 212 and 214 respectively joined to swingable members 216 and 218 having cam followers 220 thereon engageable with the periphery of cams 222 and 224 at opposite ends of shaft 116 and secured to the latter for rotation therewith. Coil springs 224 wound about the outer part of bearing sleeves 202 at opposite ends of bar 200 are secured to the rear portions of end walls 80 and 82 to bias bar 200 toward the back part of dispensing mechanism 38. The connecting rods 212 and 214 are preferably extensible by virtue of the fact that the lower part thereof threads into the upper tubular section of each rod assembly for variation of the angular positions of bell cranks 208 and 210 as necessary to assure proper timed movement of bar 200 during rotation of the cam transfer wheels 166 of drive assembly 62.

The upper compartment guide assembly 226 for conveyor units 48 includes a horizontal channel 228 pivotally mounted on end walls 80 and 82 adjacent the rear margins thereof above conveyor units 48, and serving as a mount for a number of forwardly projecting guides 230 joined by a connector 232 across the top margins thereof.

Figure 11:
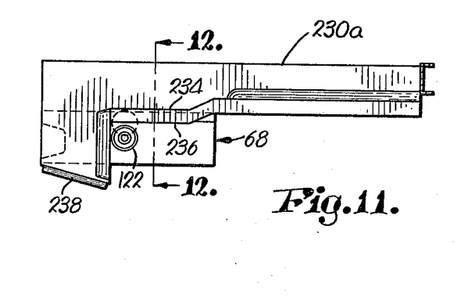
FIG. 11 is a vertical, fragmentary cross-sectional view taken substantially on the line 11—11 of FIG. 3.
Figure 12:
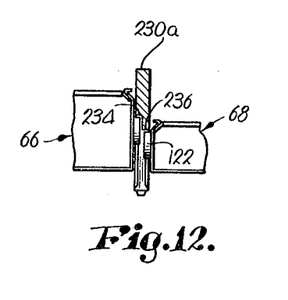
FIG. 12 is a vertical, cross-sectional view taken on the line 12—12 of FIG. 11.

Each of the guides 230 has an irregular lower margin disposed to overlie the rollers 122 of a respective compartment during forward movement thereof by bar 200, and to assure that the compartment moves onto the top of the corresponding front stack without jamming. For example, the guide 230a illustrated in FIGS. 11 and 12 and which is located between the right-hand conveyor unit 48b and the left-hand conveyor unit 48c as shown in FIG. 3, has one downwardly facing irregular cam surface 234 for guiding the top compartment 66 of conveyor unit 48b as such compartment is moved forwardly, as well as a somewhat lower irregularly configured, downwardly facing surface 236 which is cooperable with the rollers 12 of the compartments 66 of the adjacent conveyor unit 48c to assure that the top compartment shifted from the rear stack to the front stack during cyclic operation of mechanism 38 does not jam or hang up when shoved forwardly by bar 200. The forward, inclined, beveled margins 238 of each guide 230 are adapted to be received within complementally mating slots therefor in the upper ends of strips 104 to maintain each of the guides 230 aligned with respective strips. Coil springs 240 joined to connector 232 at spaced intervals along the length thereof, are wound around corresponding sleeves 242 on horizontal bar 244 between end walls 80 and 82, for providing an assist to upward swinging movement of the guide assembly 226 as necessary to facilitate replacement of product compartments or articles to be dispensed therefrom. A shield or panel 288 extends across the top of mechanism 38 directly above the front stacks of compartments.

Figure 14:
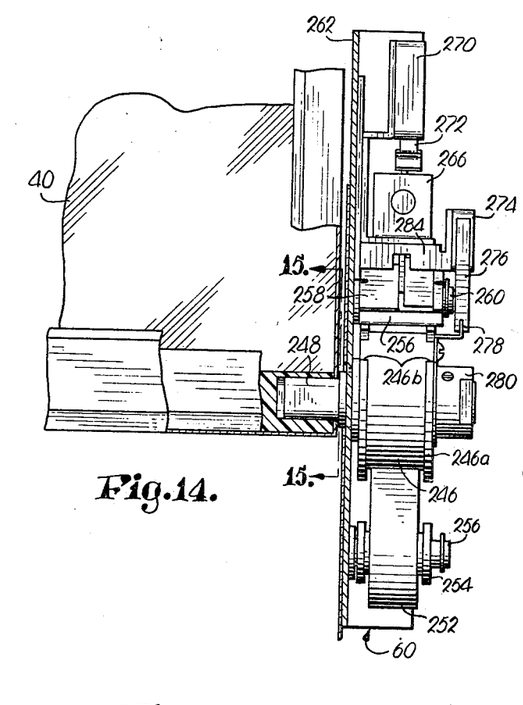
FIG. 14 is a vertical cross-sectional view taken on line 14—14 of FIG. 3 with parts being broken away and in section for clarity.
Figure 15:
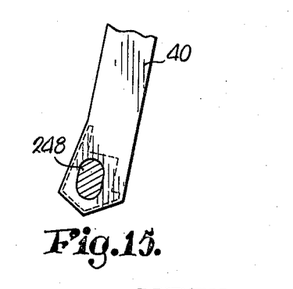
FIG. 15 is a vertical cross-sectional view taken on line 15—15 of FIG. 14.

Since the lock structures 60 at opposite ends of panel 40 are substantially identical except for the differences to be noted hereinafter, only the lock structure at the right side of cabinet 32 viewing FIG. 1 has been shown in detail in FIGS. 13, 14 and 15. The detailed description of the structure is thereby restricted to the right-hand lock structure. The drum 246 of lock structure 60 is mounted on a shaft 248 connected to a respective end of panel 40 and rotatable therewith when the customer grasps handle 250 to open the door 40 and thereby gain access to a product aligned with opening 42. Coil spring 252 secured to the periphery of drum 246 and trained around sleeve 254 carried by pin 256 serves to bias each of the drums 246 in a direction to maintain door 40 in a normally closed condition.

Figure 13:
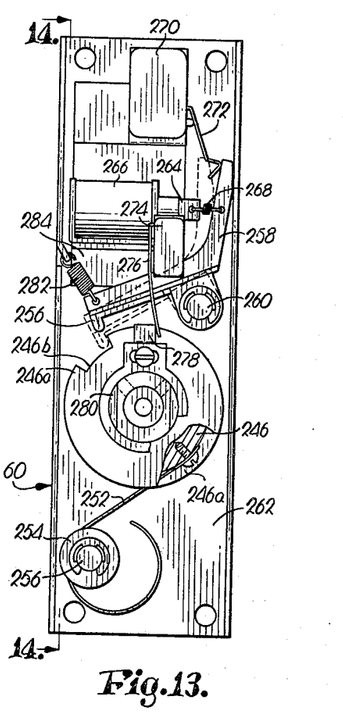
FIG. 13 is a door fragmentary side elevational view of the product access door locking structure indicated by the dotted lines at one end of the door shown in FIG. 1.

As best shown in FIG. 13, the opposed peripheral flange portions 246a of drum 246 have notches 246b which are aligned axially of the drum and adapted to receive the depending leg portion 256 of the latch member 258 mounted on pin 260 carried by support member 262. The upper end of latch member 258 above pin 260 is connected to the armature 264 of solenoid 266 by a tension spring 268.

The switch 270 has a pivotally mounted operating arm 272 thereon positioned to be engaged and depressed by the upper end of member 258 upon energization of solenoid 266, while another switch 274 in front of solenoid 266 and below the armature 264 thereof, has an operating lever 276 which is positioned to be engaged by a lug 278 affixed to drum 246 through the medium of fastener 280. Spring 282 between the lower end of member 258 adjacent leg portion 256 and the support member 262 biases the latch member 258 in a clockwise direction viewing FIG. 13. Spring 282 is connected to member 262 adjacent the bracket 284 which serves to support switch 274.

Switches 270 are provided at both ends of panel 40 but switch 274 is required only on the right-hand side of the machine viewing FIG. 1. This is the only significant difference between the lock structure 60 as opposite ends of panel 40.

A horizontal panel 290 underlying each of the conveyor units 48 below the crosspieces 92 and 94 and extending from front to rear of mechanism 38 serves as a support for the compartments during transfer thereof from the corresponding front stack to the rear stack. In the case of conveyors 48a, 48b and 48d, the panels 290 are located as shown in FIG. 2 slightly above the bottom portions of cam wheels 166 but in the case of conveyor units 48c, the panels 290 are at a higher elevation as shown in FIGS. 3 and 10 to provide compensation for the narrower compartments 68. Spaced, synthetic resin, friction reducing glides or slides 292 on the top surfaces of panels 290 facilitate movement of the compartments thereacross with it being noted that springs 176 serve to force the compartments against the panels 290 during transfer. The slides 292 on the elevated panels 290 below conveyor units 48c have opposed, converging inclined legs as shown in FIG. 10 to keep the compartments 68 from tilting and jamming when released and then moved toward the respective panels 290 by cam transfer wheels 166.

OPERATION

After loading of dispensing machine 30 with products through the opening provided by door 34, access to the individual products is dependent upon whether or not the machine is set up for pre-insertion of a required money deposit. Since the lock structures 60 shown in the drawings and described above are especially adapted for use on a money actuated machine the detailed description hereunder relates to a machine set up for deposit controlled vending of selected products. When set for coin-controlled operation the compartments directly aligned with opening 42 in cabinet 32 are not loaded with products to be dispensed. As indicated in FIG. 2, the product 286 shown in dotted lines in the uppermost compartment 66 of the front stack of conveyor unit 48b is positioned directly behind the panel assembly 36 so that the customer may view the same. In this connection, the inclined cross panel 288 between end walls 80 and 82 prevents the customer from viewing the remainder of the mechanism behind the screen.

Assuming proper monetary deposit by the customer and selection of product 286 by depression of the push button 44a, drive assembly 62 is actuated for a predetermined period of time. During the interval of operation of drive assembly 62 (illustrated schematically in FIGS. 16 to 20 inclusive), the lowermost compartment 66 of the front stack thereof is released by the respective mechanism 124 and cam transfer wheels 166 associated with conveyor unit 48b are operated through a 360° arc to transfer such compartment to the rear stack, raise the transfer compartment as well as all of those thereabove, and then actuate the pusher structure 198 to shift the uppermost compartment 66 from the rear stack thereof onto the top of the front stack. The time interval of operation of assembly 62 corresponds to a single revolution of shaft 116. As a consequence of this action, the compartment 66 having product 286 therein is lowered to a location directly aligned with product access opening 42 behind door 40. The customer may then grasp handle 250, pull the panel 40 downwardly, and reach into the interior of the alignment compartment 66 to remove product 286 therefrom. During the time that panel 40 is open, the switch 274 senses the condition of the product access door and prevents further operation of the machine if appropriate monetary deposit is made and another one of the push buttons 44 depressed.

In considering such sequence of operation in a more detailed manner with reference to FIGS. 16 to 20, the standby position of the control elements for assembly 62 and including latch mechanism 124 as well as cam transfer wheels 166, is illustrated in FIG. 16. In this condition, the lowermost compartment 66a rests on and is supported by latch member leg 140 of the respective latch mechanism 124. Member 132 is held in the locked position thereof by engagement of element 148 on armature 146 with the shoulder 151 presented by the cutout section in the corresponding plate 150. Thus, the compartment 66b above compartment 66a as well as all of those thereabove in the front stack are carried directly by the selectively actuatable latch mechanism 124.

For purposes of the present detailed discussion, it is assumed that the conveyor unit 48b was the last previously actuated conveyor, and as a result, the last to be transferred compartment 66c at the lowermost end of the rear stack of compartments, is supported by the peripheral cam surfaces 168 of respective cam transfer wheels 166 as the rollers 122 thereof rest on the cam wheels. Consequently, all of the other compartments 66 above compartment 66c are also supported by the cam transfer wheels 166. However, it is to be understood that all of the other rear stack compartments of conveyor units 48 are supported by the members 186 of 188 associated therewith.

On depression of the selector button 44a by the customer, appropriate circuitry well known in this field is energized to effect actuation of the corresponding solenoid 144 whereby the armature 146 is retracted to cause the element 148 to be shifted out of the path of the shoulder 151 presented by cutout 154. The weight of the compartment 66 in the front stack bearing on leg 134 of the member 132 tends to swing the latter in a clockwise direction viewing FIG. 16 into the position shown in FIG. 17 whereby the lowermost front compartment 66a is free to rest directly on the lobe 182c of the cam transfer wheels 166. The solenoid 144 is only momentarily energized but the member 132 does not immediately return to its initial position because of engagement of legs 134 with the outer upright margins of compartment 66a. Also, all of the compartments 66 of the front stack are now supported by the cam transfer wheels 166 associated with conveyor unit 48b.

Figure 17:
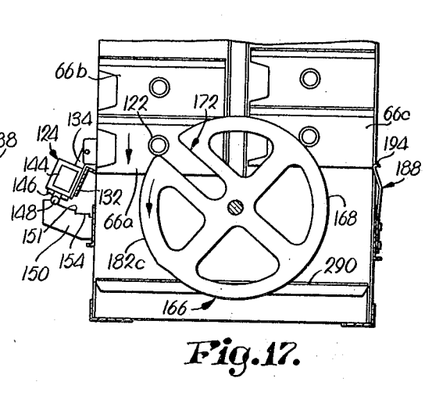
FIG. 17 is a view similar to FIG. 16, but showing the release mechanism actuated and the lowermost compartment of the left-hand stack of compartments thereby resting on and supported by the cam compartment transfer wheel proximal thereto.
Figure 18:
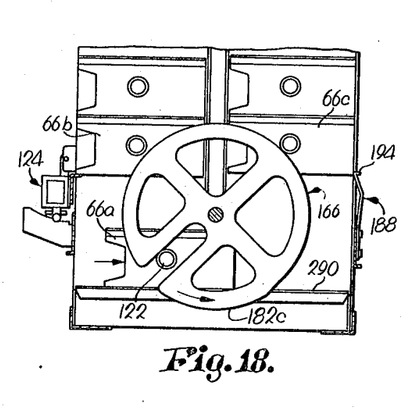
FIG. 18 is a view like FIG. 17 but showing the cam transfer wheel in a further position of rotation thereof and illustrating the way in which the just released compartment is transferred thereby.

As the cam transfer wheels 166 continue to rotate, the rollers 122 of compartment 66a move into respective slots 172 to effect shifting of the released compartment toward the rear stack of compartments as illustrated in FIG. 18. Although not specifically shown in the schematic drawings represented by FIGS. 17 and 18, it is to be appreciated that the retainer springs 176 effect a bias on the rollers 122 of the compartment 66a to force the same radially of the cam transfer wheels 166 and thus force the compartment into firm engagement with the upright guides for the compartment and then bottom panel 290. As a consequence, control is retained over the compartment 66a at all times and there is no tendency for the released compartment to tip and spill the product supported thereby. This is extremely important in those cases where the compartment is loaded with a product that is not positioned exactly in the center of the bottom wall 72 of the compartment.

During rotation of the cam transfer wheels 166 as illustrated in FIGS. 17 and 18, the compartment 66c as well as those thereabove continue to be supported by the cam surface 168 of wheels 166 as the rollers 122 of the lowermost compartment 66c ride on the peripheral margin of the transfer wheels. It is not necessary to provide support for the lowermost compartment 66b of the front stack at this stage because as soon as the compartment 66b has moved downwardly into a position to engage member 132, the latter returns to its initial latched position whereby the leg 134 thereof is located to engage the lowermost compartment of the front stack.

Figure 19:
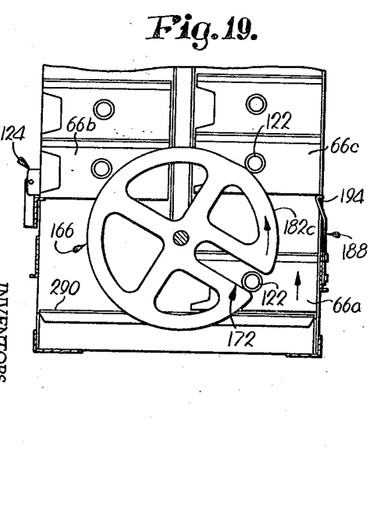
FIG. 19 is a view similiar to those just described but illustrating the cam wheel in another arcuate position thereof just preceding raising of the released compartment to a position underneath the other stack of compartments.

When the cam transfer wheels 166 reach the position shown in FIG. 19, the compartment 66a being transferred starts to rise toward the rear stack of compartments and at this same time, the rollers 122 on the compartment 66c commence to ride up on the lobe 182c of the cam transfer wheels 166 whereby the compartment 66c and those above are raised a sufficient distance to deflect the associated support members 188 and thus permit the lips 194 thereof to move directly under the lowermost compartment 66c. However, since the cam transfer wheels 166 continue to rotate in completing their cycle of operation, the transferred compartment 66a is shifted upwardly into underlying relationship to the compartment 66c and as a result, the last transferred compartment 66c remains at rest on the cam transfer wheels 166 as illustrated by the standby condition of FIG. 16. The intermediate stage of rotation of cam transfer wheels 166 between that illustrated in FIG. 19 and the standby position of FIG. 16, is shown in FIG. 20.

It is to be remembered though, that all of the cam transfer wheels 166 are rotated during each operation of the machine, and as a result, if the compartment transferred in the preceding cycle is not in the same conveyor unit next selected by a customer, the lobes 182a, 182b or 182c on cam transfer wheels 166 function to lift the compartment transferred through such preceding cycle through a displacement to bring the same into overlying relationship to corresponding support members 186 or 188 whereby the rear stack of compartments above such last to be transferred compartment then rest on the supports for the same and they are no longer dependent upon cam transfer wheels 166 for support.

Figure 21:
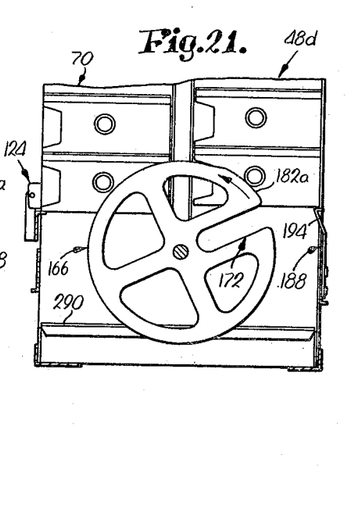
FIG. 21 is an essentially schematic representation of a conveyor unit and associated drive assembly other than the one shown in FIGS. 16–20 and thereby illustrating the way in which the rear stack of compartments of each conveyor unit are always raised through a displacement to cause the lowermost compartment to come to rest on a support therefor even if transferred during the preceding cycle of the machine and with the raised cam lobes of the cam transfer wheels being of a different length than those of transfer wheels of FIGS. 16–20 to cause the raising of the rear stacks during each operating cycle to be staggered.

It is apparent that during each cycle of operation of the machine, the cam transfer wheels 166 operate to lift all of the compartments in the rear stacks of corresponding conveyor units 48, as is illustrated by FIG. 21, but not all of the rear stacks are raised simultaneously because of the staggered relationship of lobes 182a, 182b and 182c. Only one-third of the rear stacks will be raised at a time and a considerable cost saving is effected as a result since a much smaller motor than would otherwise be required may be used to operate the drive assembly 62.

Figure 20:
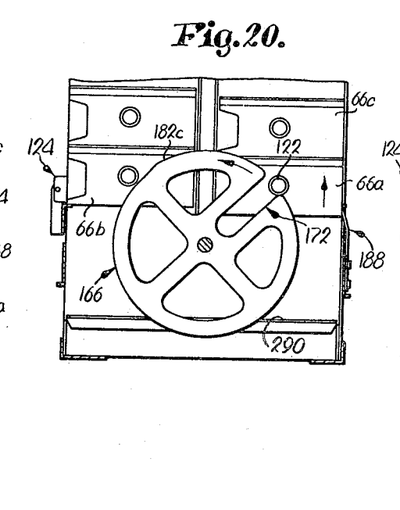
FIG. 20 illustrates the way in which the cam wheel shifts the released compartment into underlaying relationship to the other stack of compartments and as a consequence raises all of the compartments of that stack.

The followers 220 on members 216 riding on cams 222 and 224 rotatable with transfer wheels 166, serve to shift the bar 200 in timed relationship to rotation of cam transfer wheels 166 so that the bar 200 is shifted rearwardly through a displacement to clear the outermost compartment 66 of the conveyor unit 48b as the rear stack of compartments are raised, as indicated in the cyclic sequence of FIGS. 19 and 20, whereupon the cams 222 and 224 are operable to shift the bar 200 forwardly during oscillation of bell cranks 208 and 210 to push the uppermost compartment 66 of the rear stack forwardly onto the uppermost end of the front stack of compartments. The guides 230 facilitate forward motion of the compartments and prevent jamming thereof against the frame components of the mechanism.

Upon cycling of the drive assembly 62, both of the solenoids 266 are energized to rotate members 258 connected thereto through arcuate paths to bring the leg portions 256 of members 258 into respective notches 246b and thereby lock panel 40 against opening. Swinging of each of the members 258 causes the operating arms 272 thereof to be depressed thereby closing the circuit to solenoids 266 and maintaining the same energized until broken by other circuitry signaling end of the conveyor moving cycle.

As previously indicated, rollers 122 on each of the product compartments are located about ⅛ inch forwardly of a vertical center line through opposed side walls 74 and 76 of respective compartments. The advantages of this arrangement are best understood when it is recognized that desirably the rear stack of compartments are maintained at a slightly higher elevation than the front stack of compartments at the time the upper compartment of the rear stack is shoved forwardly onto the top of the front stack. Since the coin transfer wheels 166 in standby are located with the lobes 182 thereof directly under the wheels 122 of the lower compartments of the front stacks, the forward disposition of rollers 122 permits support of the lower compartment of a respective front stack at a somewhat lower elevation than would otherwise be possible without engagement of the wheels 122 with the peripheral surface of the coin transfer wheels. A concomitant advantage of this disposition of wheels 122 is the fact that although the rear stacks of compartments are raised during each cycle of operation so that they are supported by members 186 or 188, the positioning of wheels 122 forwardly of the described center line causes the compartments to be raised to a somewhat higher elevation than would otherwise be the case and consequently permitting location of lips 194 at a sufficiently high level that the compartments of the rear stack are maintained at a somewhat higher elevation than the front stack of compartments to facilitate top transfer as described.

Having thus described the invention, what is claimed as new and desired to be secured by Letters Patent is:

1. In a selective product dispensing machine having a product access station,
   a series of product dispensing conveyor units each provided with a pair of separate stacks of individual, vertically shiftable product compartments with the compartments of each conveyor unit being successively registrable with the product access station upon incremental shifting of the compartments; and
   selectively operable mechanism including a drive assembly common to all of the conveyor units for controlling and effecting incremental movement of the stacks of a selected conveyor unit only to successively bring the compartments thereof into registration with said product access station, said mechanism being operable during each actuation thereof to release only the lowermost compartment from one stack of the selected conveyor unit and thereby permit the remaining compartments thereabove to be lowered one step, transfer the released compartment to the bottom of the other stack of the selected conveyor unit, raise the other stack of the selected conveyor unit one step, and shift the uppermost compartment of the other stack to the top of the said one stack of the selected conveyor unit.

2. A machine as set forth in claim 1, wherein said mechanism includes latch means for each of the conveyor units and each of said latch means being provided with a shiftable member normally releasably engaging the lowermost compartment of said one stack of a respective conveyor unit in supporting relationship to the compartment of said one stack.

3. A machine as set forth in claim 2, wherein each of said latch members is mounted for swinging movement about an axis above the normal area of engagement of the member with a respective lowermost compartment of an adjacent stack and movable in a direction away from the compartment.

4. A machine as set forth in claim 3, wherein each of said latch members has an outwardly projecting leg thereon positioned to normally underlie the lowermost compartment of an adjacent stack in supporting relationship thereto, said latch means further including a stop adjacent each latch member, a shiftable element on each latch member normally engaging an adjacent stop and a selectively operable device for shifting each of the elements out of engagement with a corresponding stop.

5. A machine as set forth in claim 4, wherein each of said devices comprises a solenoid having a shiftable armature, each of said armatures being connected to a corresponding element for shifting the latter.

6. A machine as set forth in claim 4, wherein each of said stops is positioned below the leg of a corresponding latch member so that upon shifting of a respective element out of engagement with its associated stop the weight of the compartment on the leg thereunder tends to swing the respective latch member through an arc to effect release of the compartment thereabove.

7. A machine as set forth in claim 1, wherein said drive assembly of the mechanism includes compartment transfer structure having a pair of rotatable drive members for each conveyor unit operable to receive the released compartment from said one stack of the selected conveyor unit and move such released compartment into underlying relationship to the other associated stack while retaining control over said released compartment during transfer thereof.

8. A machine as set forth in claim 7, wherein each of the compartments of said conveyor units has a pair of upright side walls and a control element projecting outwardly from each side wall, each of said pair of drive members being provided with a radial slot therein located to receive the control element of a respective side wall and thus transfer the released compartment into underlying relationship to said other stack of the selected conveyor unit during rotation of the drive members by said drive assembly.

9. A machine as set forth in claim 8, wherein each of said drive members has a generally circular cam surface thereon located to receive the control element thereon of the lowermost compartment of said one stack of a respective conveyor unit upon release of the corresponding lowermost compartment and to support the latter and the compartments thereabove as the drive member is rotated through a sufficient arc to permit the associated control element to move into said slot therein.

10. A machine as set forth in claim 9, wherein is provided support means for said other stack of each of the conveyor units and positioned to engage the lowermost compartment of said other stack of a respective conveyor unit except the lowermost compartment last to be transferred by said structure during operation of the drive assembly, the control element of the last to be transferred compartment resting on the cam surface of the associated drive member, each of said drive members having a raised cam lobe leading from a respective cam surface thereon and located to engage the control element of the compartment transferred on the preceding cycle of the drive assembly to raise such compartment and thereby the compartments thereabove to an extent to cause said previously transferred compartment to move onto and be supported by an associated support means for the other stack of a respective conveyor means.

11. A machine as set forth in claim 8, wherein is provided a generally horizontal panel in underlying relationship to said drive assembly and guide means disposed to be engaged by the released compartment from each of the conveyor units for maintaining each released compartment in a generally horizontal position until such compartment is moved into a disposition to be moved across the panel therebelow by corresponding drive members.

12. A machine as set forth in claim 11, wherein is provided spring means on said drive members and extending across the radial slots therein in dispostion to be engaged and deflected by the rollers of a released compartment upon entry of the rollers into corresponding slots whereby said spring means operate to force the released compartment toward the guide means and said panel respectively to provide control over the released compartment during transfer thereof.

13. A machine as set forth in claim 12, wherein said cam lobes on certain of the drive members are circumferentially out of phase with the cam lobes on other of the drive members to stagger the raising of the compartments of said other stacks of the conveyor units during a cycle of rotation of the drive members by said drive assembly.

14. A machine as set forth in claim 8, wherein each of said control elements comprises a wheel rotatably mounted on a respective side wall of the compartments.

15. A machine as set forth in claim 8, wherein each of the compartments is provided with a pair of spaced side walls having oppositely directed, outwardly extending control elements thereon and said structure includes a drive member for each of the control elements.

16. A machine as set forth in claim 8, wherein the control elements on the side walls of the compartments of each conveyor unit are the same distance from the bottom of respective compartments but the height of the compartments varies in different conveyor units to permit dispensing of products of various heights from the machine.

17. A machine as set forth in claim 8, wherein each of the compartments of said conveyor units has a pair of opposed, upright side walls with the distance between opposed side walls of the compartments in respective conveyor units being the same but varying from one conveyor unit to another to permit dispensing of products of various widths from the machine.

18. A machine as set forth in claim 8, wherein each of the compartments of said conveyor units has a pair of opposed, upright side walls with the distance between and height of opposed side walls in respective conveyor units being the same but varying from one conveyor unit to another to permit dispensing of products of various heights and widths from the machine.

19. A machine as set forth in claim 18, wherein the compartments of all of the conveyor units are of the same dimension front to back thereof.

20. A machine as set forth in claim 8, wherein each of the drive members has a circumferentially extending, outwardly facing, generally circular cam surface thereon disposed to engage a respective control element of the lowermost compartment of said one stack of a corresponding conveyor unit upon release of the lowermost compartment and to transfer the same to the associated other stack in supporting relationship to the compartments thereabove, the control elements on each of the side walls of the compartments being spaced forwardly of upright center lines through corresponding side walls of the compartments a sufficient distance to cause the series of compartments in said other stack supported by a respective drive member to be maintained at a higher elevation than the series of compartments in said one stack of compartments associated therewith to facilitate transfer of the uppermost compartment of said other stack of each conveyor unit to the top of said one stack aligned therewith.

21. In a machine having a series of product dispensing conveyor units each provided with a pair of separate stacks of individual, vertically shiftable product compartments, mechanism for controlling and effecting successive movement of the compartments of a selected conveyor unit through a product access station by lowering one stack one step, raising the other stack one step, shifting the uppermost compartment of said other stack to the top of the one stack and transferring the lowermost compartment of the one stack to the bottom of said other stack of the selected conveyor unit, said mechanism comprising:

selectively operable latch means for each of the conveyor units and each including a shiftable member normally engaging the lowermost compartment of said one stack of a respective conveyor unit in supporting relationship thereto;

a drive assembly common to all of said conveyor units and including transfer structure for each of the conveyor units operable to receive the lowermost compartment from said one stack of a selected conveyor unit upon release thereof by the corresponding latch member and to move the released compartment into underlying relationship to said other stack of the selected conveyor unit;

support means for said other stack of each of the conveyor units and positioned to engage the lowermost compartment of said other stack of a respective conveyor unit except the lowermost compartment last to be transferred by said structure during operation of the drive assembly, said transfer structure having lifting means positioned to engage the last to be transferred compartment and move the latter along with the compartments thereabove in said other stack of the respective conveyor unit upwardly to an extent to permit the last to be transferred compartment to engage a corresponding support means therefor and thus be supported by the latter; and means operable each time the drive assembly is operated to shift the uppermost compartment of said other stack of a selected conveyor unit after raising thereof onto the top of the respective one stack.

22. A machine as set forth in claim 21, wherein said drive assembly includes a rotatable shaft supporting said transfer structure and located below said stacks of compartments, a pusher bar adjacent the upper extremities of the stacks of said conveyor units, and movable through a generally rectilinear path of travel to shift the uppermost compartment of said other stack which has been raised, onto the top of the one stack which has been lowered, and cam and linkage structure joining the shaft to said bar for shifting the latter rearwardly to a compartment clearing position during initial rotation of the shaft and thereafter forwardly to push the uppermost compartment of the other stack which has been raised onto the top of the stack of compartments which have been lowered.

23. In a selective product dispensing machine having a cabinet provided with a product access opening thereacross and a series of product dispensing conveyor units having a series of product compartments and mechanism for bringing the compartments of a selected conveyor successively into register with said product access opening, the combination with said cabinet and the conveyor units of:

a door swingably mounted on the cabinet in normal closing relationship to said product access station;

a drum secured to the door for rotation during swinging of the door, said drum being provided with a notch in the periphery thereof; and latch means shiftable from a position away from the drum to a location within said notch therein to prevent significant rotation of the drum and thereby opening of said door; and actuating means connected to said latch means for shifting the same to said location thereof in response to operation of any one of the conveyor units.

24. A machine as set forth in claim 23, wherein said latch means comprises an L-shaped member provided with a leg thereon disposed to be received in said notch in the drum upon swinging the member, and a solenoid operably joined to said L-shaped member for swinging the latter to selectively move the leg thereof into said notch.

25. A machine as set forth in claim 24, wherein is provided a lug on said drum and switch means disposed to sense the disposition of the lug when the door is moved away from the closed position thereof to prevent actuation of any of said conveyor units.

References Cited

UNITED STATES PATENTS 2,661,259  12/1953  Rippon _____________ 221—78 X

FOREIGN PATENTS 1,063,720  3/1967  Great Britain.

SAMUEL F. COLEMAN, Primary Examiner